(12) United States Patent
Nekozuka

(10) Patent No.: US 8,791,870 B2
(45) Date of Patent: Jul. 29, 2014

(54) PORTABLE ELECTRONIC DEVICE

(75) Inventor: Hikaru Nekozuka, Yokohama (JP)

(73) Assignee: Kyocera Corporation, Kyota (JP)

( * ) Notice: Subject to any disclaimer, the term of this patent is extended or adjusted under 35 U.S.C. 154(b) by 572 days.

(21) Appl. No.: 13/131,567

(22) PCT Filed: Nov. 26, 2009

(86) PCT No.: PCT/JP2009/006396
§ 371 (c)(1),
(2), (4) Date: Jul. 25, 2011

(87) PCT Pub. No.: WO2010/061610
PCT Pub. Date: Jun. 3, 2010

(65) Prior Publication Data
US 2011/0273346 A1    Nov. 10, 2011

(30) Foreign Application Priority Data

Nov. 26, 2008    (JP) .................. 2008-301189

(51) Int. Cl.
*H01Q 1/00*    (2006.01)

(52) U.S. Cl.
USPC ........................................ 343/729

(58) Field of Classification Search
USPC .............. 343/702, 726, 729, 866, 869, 882; 455/90.3, 95
See application file for complete search history.

(56) References Cited

U.S. PATENT DOCUMENTS

| | | | |
|---|---|---|---|
| 6,011,519 A * | 1/2000 | Sadler et al. | 343/742 |
| 7,262,736 B2 * | 8/2007 | Sunaga | 343/702 |
| 7,362,275 B2 * | 4/2008 | Tu et al. | 343/702 |
| 2003/0129950 A1 * | 7/2003 | Kwak | 455/90 |
| 2004/0227673 A1 * | 11/2004 | Iwai et al. | 343/702 |
| 2009/0224982 A1 | 9/2009 | Isoda et al. | |

FOREIGN PATENT DOCUMENTS

| | | |
|---|---|---|
| CN | 101010929 A | 8/2007 |
| JP | 2004-5494 A | 1/2004 |
| JP | 2005-217917 A | 8/2005 |
| JP | 2006-148462 A | 6/2006 |
| JP | 2007-6029 A | 1/2007 |
| JP | 2007-336480 A | 12/2007 |

OTHER PUBLICATIONS

International Search Report for PCT/JP2009/006396, mailed Mar. 2, 2010.
Office Action issued in Korean Patent Application No. 10-2011-7014524, mailed on Sep. 26, 2012.
Official Action issued to CN Application No. 200980146637.9, mailed Nov. 15, 2013.

* cited by examiner

Primary Examiner — Seung Lee
(74) Attorney, Agent, or Firm — Hoffmann & Baron, LLP

(57) ABSTRACT

Provided is a portable electronic device which can be changed between a first state and a second state and comprises an antenna that forms a loop in the first state and does not form the loop in the second state. A mobile telephone comprises: an operation unit-side casing; a display unit-side casing; a linking part which links the operation unit-side casing and the display unit-side casing in such a way that it is possible to change between the first state and the second state; and a loop antenna which is disposed at the operation unit-side casing and the display unit-side casing and is changed to form a loop in the first state and not to form the loop in the second state.

6 Claims, 14 Drawing Sheets

# PORTABLE ELECTRONIC DEVICE

CROSS-REFERENCE TO RELATED APPLICATIONS

This application is the National Stage of International Application No. PCT/JP2009/006396, filed Nov. 26, 2009, which claims the benefit of Japanese Application No. 2008-301189, filed Nov. 26, 2008, the entire contents of all of which are incorporated by reference herein.

FIELD OF THE INVENTION

The present invention relates to a portable electronic device such as a cellular telephone device.

BACKGROUND OF THE INVENTION

In recent years, some cellular telephone devices as portable electronic devices include a function similar to a contactless IC card.

For example, there has been proposed a cellular telephone device including a loop antenna, in which information is read and written by inductive coupling of an external device and the loop antenna (for example, see Patent Document 1).

Patent Document 1: Japanese Unexamined Patent Application, Publication No. 2007-336480

SUMMARY OF THE INVENTION

Problems to be Solved by the Invention

The present invention provides a portable electronic device including a loop antenna, in which information is read and written by inductive coupling of an external device and the loop antenna, bodies in relative positions are transformable into a first state and a second state, and each state is associated with using or not using the loop antenna.

Means for Solving the Problems

The present invention relates to a portable electronic device including: a first body; a second body; a connecting portion that connects the first body and the second body so as to be transformable into a first state and a second state; and an antenna that is disposed in the first body and the second body, and is transformed such that a loop is formed in the first state, and a loop is not formed in the second state.

Moreover, the present invention relates to a portable electronic device including: a first body including a first face; a second body including a second face; a connecting portion that connects the first body and the second body so as to be openable and closable around an opening-and-closing axis, and transformable into an opened state in which the first face and the second face are disposed to be separated from each other, and a closed state in which the first face and the second face are disposed to be superimposed in a state of being adjacent to each other; and an antenna that is disposed in the first body and the second body, and is transformed such that a loop is formed in the opened state, and a loop is not formed in the closed state.

The present invention relates to a portable electronic device including: a first body including a first face; a second body that is disposed so as to be superimposed on a side of the first face of the first body; a connecting portion that connects the first body and the second body so as to be slidably moved and to be transformable into an opened state in which a predetermined area of the first face is externally exposed, and a closed state in which the predetermined area is covered; and an antenna that is disposed in the first body and the second body, and is transformed such that a loop is formed in the opened state, and a loop is not formed in the closed state.

Effects of the Invention

According to the present invention, it is possible to provide a portable electronic device that is transformable into a first state and a second state, and includes an antenna that forms a loop in the first state and does not form a loop in the second state.

Figure 1:
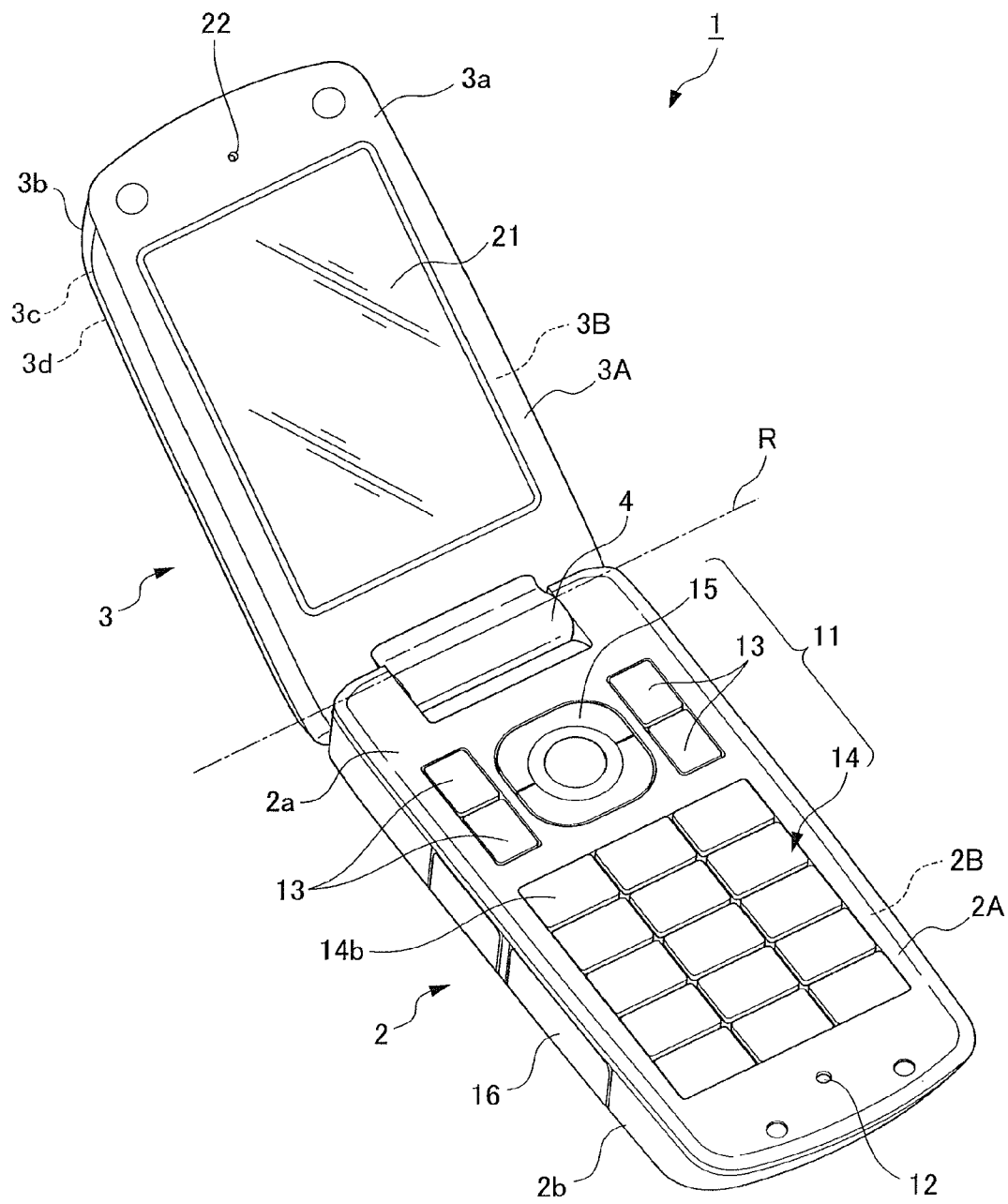
FIG. 1 shows a perspective view showing an appearance of a cellular telephone device 1 in an opened state.

EXPLANATION OF REFERENCE NUMERALS 1 cellular telephone device
2 operation unit side body
2A operation unit side inner face
3 display unit side body
3A display unit side inner face
4 connecting portion
100 loop antenna
100*a* first portion
100*b* second portion
100*c* third portion, third portion A
102 sheet portion
104 coil portion
S opening-and-closing axis
R rotational axis

DETAILED DESCRIPTION OF THE INVENTION

A preferred embodiment for carrying out the present invention is hereinafter described with reference to the drawings.

First, a basic structure of a cellular telephone device 1 is described with reference to FIG. 1. FIG. 1 shows a perspective view showing an appearance of the cellular telephone device 1 in an opened state.

As shown in FIG. 1, the cellular telephone device 1 as a portable electronic device includes: an operation unit side body 2 as a first body; and a display unit side body 3 as a second body. The operation unit side body 2 includes: an operation unit side inner face 2A as a first face; and an operation unit side outer face 2B as a third face that is opposite to the operation unit side inner face 2A. The display unit side body 3 includes: a display unit side inner face 3A as a second face; and a display unit side outer face 3B as a fourth face that is opposite to the display unit side inner face 3A.

The operation unit side body 2 and the display unit side body 3 are connected via a connecting portion 4 including a hinge mechanism. More specifically, an upper end portion of the operation unit side body 2 and a lower end portion of the display unit side body 3 are connected via the connecting portion 4.

The connecting portion 4 connects the operation unit side body 2 and the display unit side body 3 so as to be openable and closable around the opening-and-closing axis R, such that the operation unit side body 2 and the display unit side body 3 are transformable into: an opened state in which the display unit side body 3 is disposed in a closed position as a first relative position with regard to the operation unit side body 2, and the operation unit side inner face 2A and display unit side inner face 3A are disposed so as to be separated from each other; and a closed state in which the display unit side body 3 is disposed in an opened position as a second relative position with regard to the operation unit side body 2, and the operation unit side inner face 2A and display unit side inner face 3A are disposed so as to be superimposed in a state of being adjacent to each other.

As a result, the cellular telephone device 1 is configured such that the operation unit side body 2 and the display unit side body 3 connected via the connecting portion 4 can be relatively moved. In other words, the cellular telephone device 1 can be switched (transformed) between a state in which the operation unit side body 2 and the display unit side body 3 are opened (the opened state), and a state in which the operation unit side body 2 and the display unit side body 3 are folded (the closed state). Here, in terms of the bodies, the closed state refers to a state in which both bodies are disposed so as to be mutually superimposed, and the opened state refers to a state in which both bodies are disposed so as not to be mutually superimposed.

An outer face of the operation unit side body 2 is configured with a front case 2a and a rear case 2b. The operation unit side body 2 is configured to expose, on the front case 2a side (the operation unit side inner face 2A side), an operation key set 11 and a microphone 12 as a microphone to which sound produced by a user of the cellular telephone device 1 during a phone call is input.

The operation key set 11 is configured with: function setting operation keys 13 for operating various functions such as for various settings, a telephone number directory function and a mail function; input operation keys 14 for inputting the digits of a telephone number, characters for mail, and the like; and a selection operation key 15 for performing selection of the various operations, scrolling up, down, left and right, etc. Predetermined functions are assigned (key assignment) to each key configuring the operation key set 11 in accordance with the opened/closed state of the operation unit side body 2 and the display unit side body 3, various modes, and the type of application that is running. An operation corresponding to a function assigned to each key is executed by the user depressing each key.

The microphone 12 is disposed to an outer end side that is opposite to the connecting portion 4 side in a longitudinal direction of the operation unit side body 2. In other words, the microphone 12 is disposed to one outer end side of the cellular telephone device 1 in the opened state.

An interface (not illustrated) for communicating with an external device (for example, a host device) is disposed on one side face of the operation unit side body 2. Side keys, to which predetermined functions are assigned, and an interface (not illustrated) where external memory is inserted and removed are disposed on another side face of the operation unit side body 2. Each interface is covered with a cap. When not in use, each interface is covered with a cap.

An outer face of the display unit side body 3 is configured with a front panel 3a, a front case 3b, a rear case 3c, and a rear panel 3d. In the display unit side body 3, a display unit 21 for displaying a variety of information on the display unit side inner face 3A, and a speaker 22 as a receiver for outputting sound of the other party of a phone call are disposed so as to be exposed to the outside.

The display unit 21 is configured with a liquid crystal display panel, a drive circuit that drives the liquid crystal display panel, and a light source unit such as a backlight that irradiates light from the back face side of the liquid crystal display panel.

Next, internal structures of the operation unit side body 2 and the display unit side body 3 are described with reference to FIGS. 2 to 6.

Figure 2:
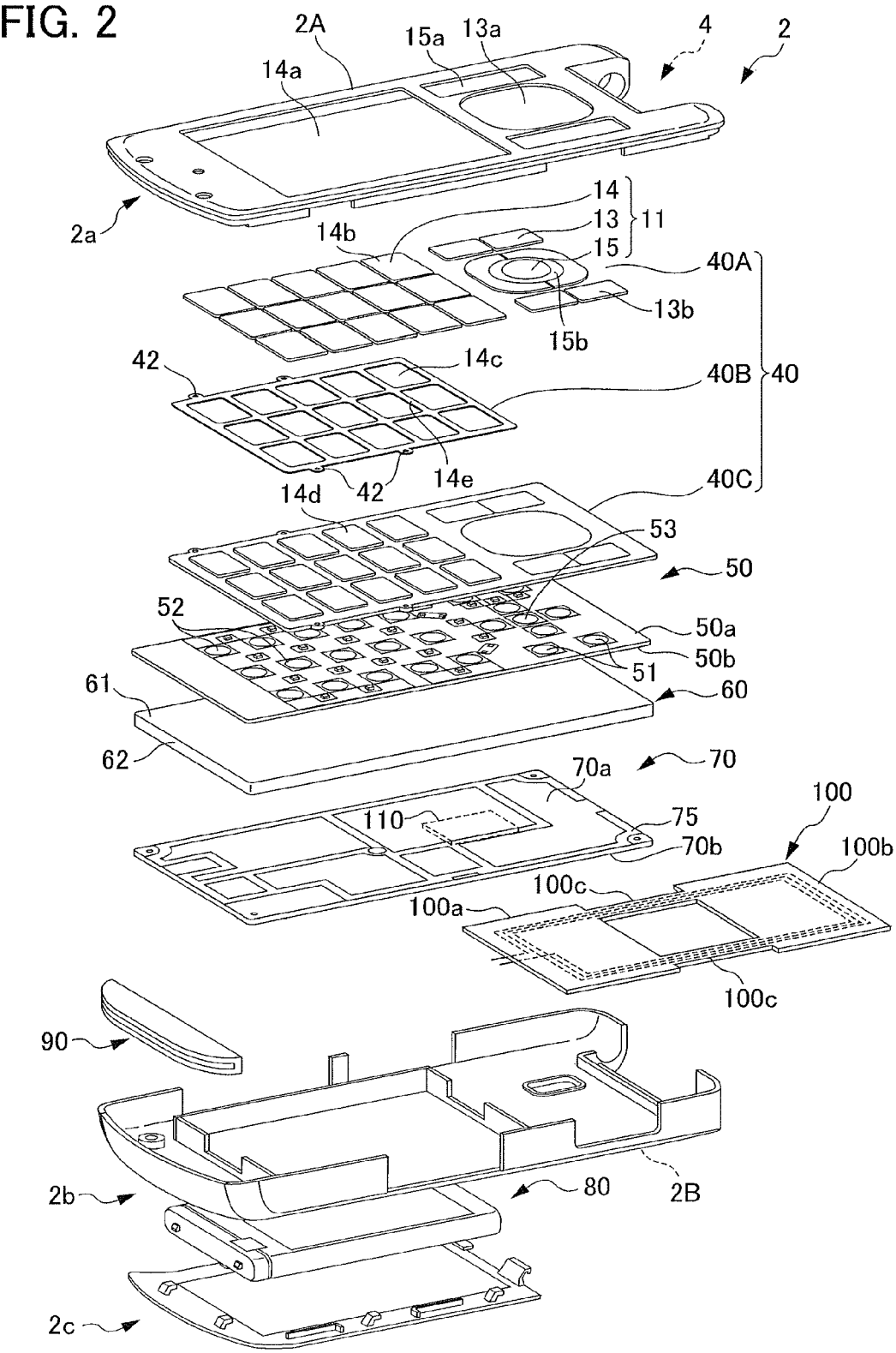
FIG. 2 is an exploded perspective view of members built into an operation unit side body 2.
Figure 3:
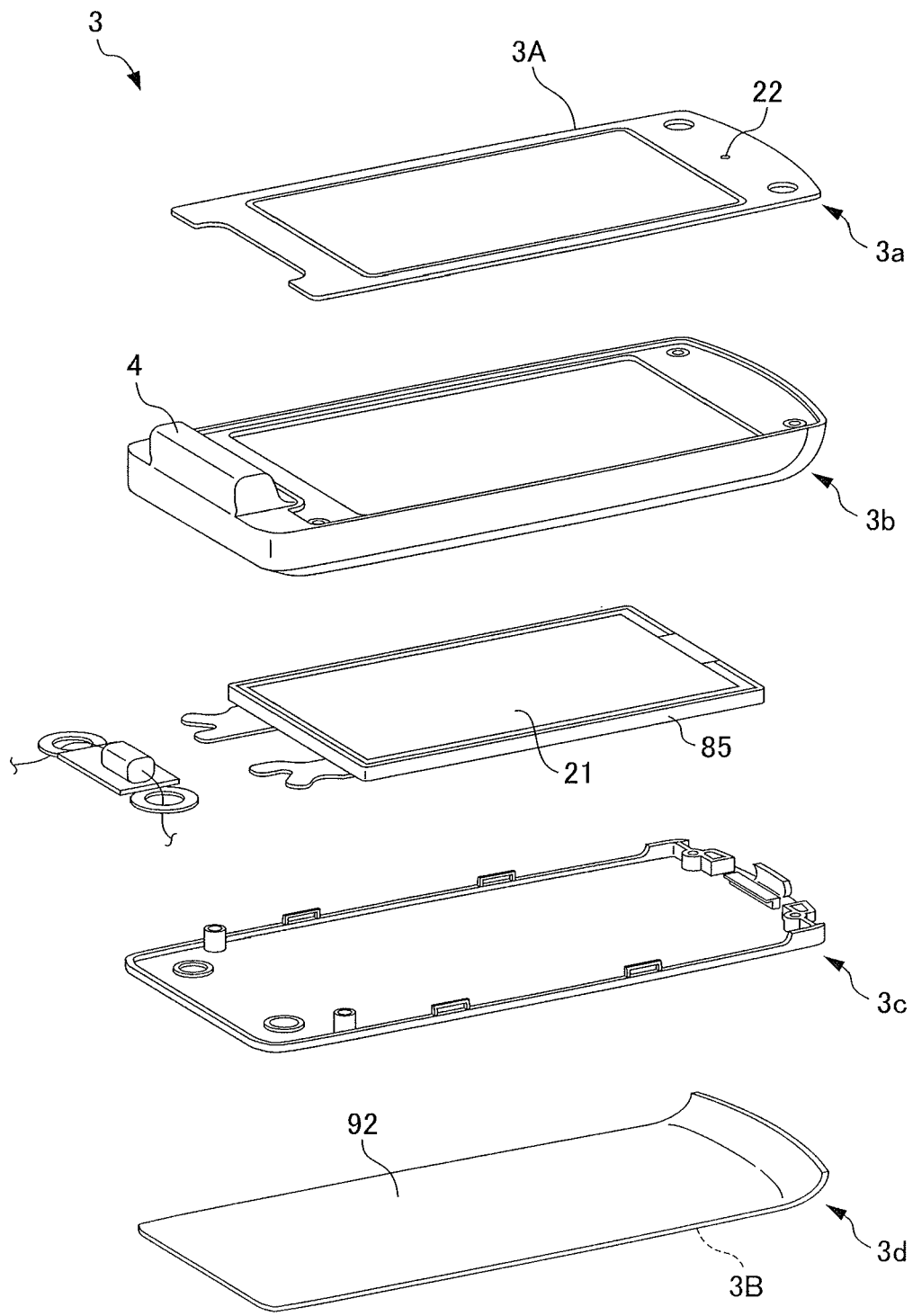
FIG. 3 is an exploded perspective view of members built into a display unit side body 3.
Figure 4:
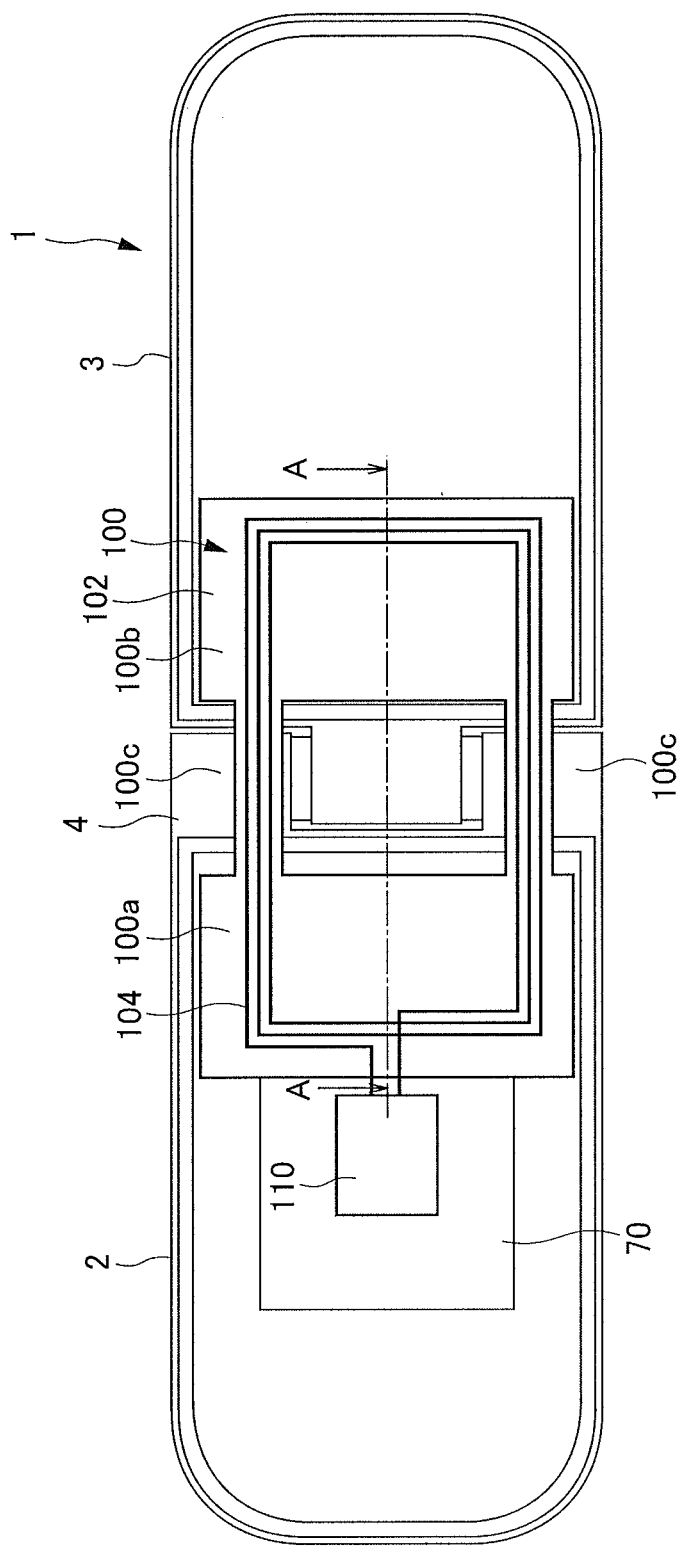
FIG. 4 is a plan view illustrating a loop antenna 100 in a case in which the cellular telephone device 1 is in the opened state.
Figure 5:
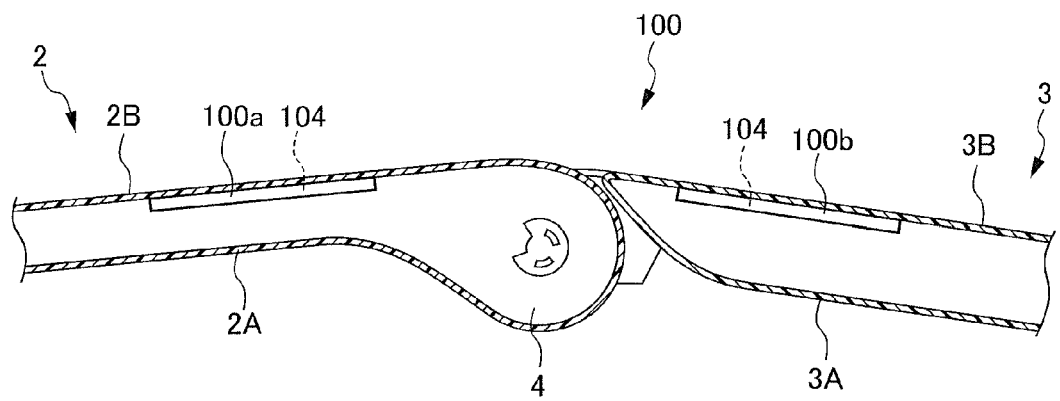
FIG. 5 is a cross-sectional view along a line A-A illustrating the loop antenna 100 in a case in which the cellular telephone device 1 is in the opened state.
Figure 6:
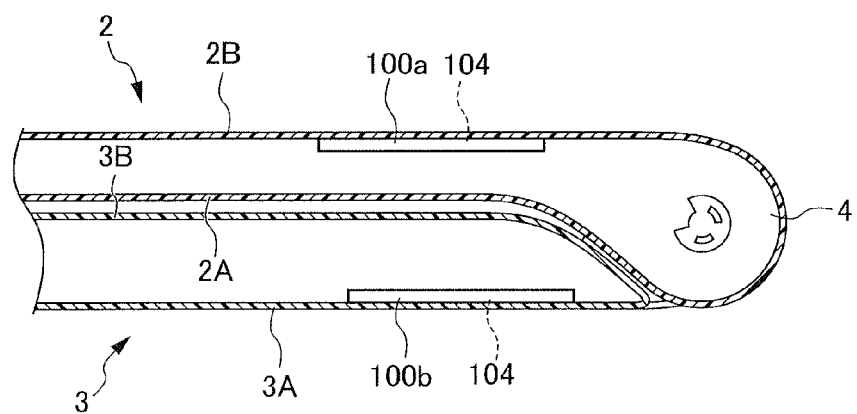
FIG. 6 is a cross-sectional view along the line A-A illustrating the loop antenna 100 in a case in which the cellular telephone device 1 is in the closed state.

FIG. 2 is an exploded perspective view of members built into the operation unit side body 2. FIG. 3 is an exploded perspective view of members built into the display unit side body 3. FIG. 4 is a plan view illustrating a loop antenna 100 in a case in which the cellular telephone device 1 is in the opened state. FIG. 5 is a cross-sectional view along a line A-A illustrating the loop antenna 100 in a case in which the cellular telephone device 1 is in the opened state. FIG. 6 is a cross-sectional view along the line A-A illustrating the loop antenna 100 in a case in which the cellular telephone device 1 is in the closed state.

As shown in FIG. 2, the operation unit side body 2 includes: the front case 2a; a key structure unit 40; a key substrate 50; a case body 60; a circuit board 70 including various electronic components such a reference potential patterned layer 75 and an RF (Radio Frequency) module for a cellular telephone device; a main antenna unit 90 for radio communication via an external base station; the loop antenna 100 that forms a loop in the opened state; the rear case 2b including a battery lid 2c; and a battery 80.

The front case 2a and the rear case 2b are disposed such that concave inner surfaces thereof face each other, and are connected such that peripheries thereof are superimposed with each other. Moreover, the key structure unit 40, the key substrate 50, the case body 60, the circuit board 70, the main antenna unit 90 and the loop antenna 100 are built therein so as to be interposed between the front case 2a and the rear case 2b.

Key holes 13a, 14a and 15a are formed in the inner face (the operation unit side inner face 2A) of the front case 2a, which faces the display unit 21 of the display unit side body 3 in the closed state in which the cellular telephone device 1 is folded. Each depression face of function setting operation key members 13b that configure the function setting operation keys 13, each depression face of input operation key members 14b that configure the input operation keys 14, and a depression face of a selection operation key member 15b that configures the selection operation key 15 are exposed from the key holes 13a, 14a and 15a, respectively. By pushing so as to depress each depression face of the function setting operation key members 13b, the input operation key members 14b, and the selection key member 15b, which are thus exposed, an apex of a metal dome (shaped like a bowl) (to be described later) provided in each of key switches 51, 52 and 53 is depressed, thereby contacting a switch terminal to establish electrical connection.

The key structure unit 40 is configured with operation members 40A, a key frame 40B as a reinforcing member, and a key sheet 40C as a sheet member.

The operation members 40A are configured with a plurality of key operation members. More specifically, the operation members 40A are configured with the function setting operation key members 13b, the input operation key members 14b and the selection operation key member 15b. Each operation key member that configures the operation members 40A is adhered to the key sheet 40C by interposing the key frame 40B (to be described later) therebetween. The depression faces of the operation key members adhered to the key sheet 40C are disposed so as to be exposed from the key holes 13a, 14a and 15a to the outside, respectively, as described above.

The key frame 40B is a metallic plate-like member with a plurality of holes 14c formed therein. The key frame 40B is a reinforcing member for preventing an adverse effect on the circuit board 70 and the like due to depression of the input operation key members 14b. Moreover, the key frame 40B is an electrically conductive member, and also functions as a member for dissipating static electricity of the input operation key members 14b. Convex portions 14d formed on the key sheet 40C (to be described later) are disposed to fit in the plurality of holes 14c formed in the key frame 40B. In addition, the input operation key members 14b are adhered to the convex portions 14d.

The key sheet 40C is a sheet member made of flexible silicon rubber. The plurality of convex portions 14d are formed on the key sheet 40C as described above. The plurality of convex portions 14d are formed on a side on which the key frame 40B is disposed on the key sheet 40C. The plurality of convex portions 14d are formed in positions corresponding to the key switches 52 (to be described later), respectively.

The key substrate 50 has the plurality of key switches 51, 52 and 53 disposed on a first face 50a that is a face on the key sheet 40C side. The plurality of key switches 51, 52 and 53 are disposed in positions corresponding to the operation members 40A, respectively. The key switches 51, 52 and 53 disposed on the key substrate 50 have a structure of a metal dome made of a metal plate that is three-dimensionally curved like a bowl. The metal dome is configured such that, when an apex of the bowl-shaped metal dome is depressed, contact is made with a switch terminal formed on an electric circuit (not illustrated) printed on the key substrate 50, thereby establishing an electrical connection. Moreover, a plurality of metal interconnections are formed on a second face 50b side of the key substrate 50.

As shown in FIG. 2, the case body 60 is an electrically conductive member having a shape in which one large face of a thin right-angled parallelepiped is opened. The case body 60 has a rib 62 that is formed substantially perpendicularly to a face of the opening side of a flat plate portion 61. The rib 62 is formed with a height as high as, or sufficiently higher than, the highest electronic component among the various electronic components mounted on the circuit board 70. The rib 62 is formed so as to correspond to the reference potential patterned layer 75 that configures a reference potential portion at the periphery and inside of the flat plate portion 61. More specifically, the rib 62 is formed so as to be disposed on the reference potential patterned layer 75 in a state where the case body 60 is placed on the circuit board 70. It should be noted that, instead of forming the case body 60 with metal, the case body 60 may be formed with a skeleton formed of resin, and a conductor film formed on a surface thereof.

By causing a bottom face of the rib to abut on the reference potential patterned layer 75, the case body 60 is electrically connected to the reference potential patterned layer 75. The case body 60 is electrically connected to the reference potential patterned layer 75, and thus has an electric potential that is as high as that of the reference potential patterned layer 75. In other words, the case body 60 functions as a shielding case. As a shielding case, the case body 60 suppresses influence of noise such as a high frequency wave from the outside on various electronic components disposed on the circuit board 70, and shields noise emitted from an RF (Radio Frequency) circuit, a CPU circuit, a power supply circuit and the like, thereby suppressing influence of such noise on other electronic components, a receiving circuit and the like connected to the main antenna unit 90. More specifically, the bottom face of the rib 62 in the case body 60 is disposed on the reference potential patterned layer 75, and as a result, each circuit (to be described later) is surrounded by the rib 62 and covered with a part of the flat plate portion 61. The rib 62 functions as a partition wall in each circuit, and each circuit is shielded by the rib 62 and a part of the flat plate portion 61.

As shown in FIG. 2, various electronic components and circuits (not illustrated) including a signal processing unit that processes a signal transmitted and received via the main antenna unit 90 are disposed on the circuit board 70. The various electronic components form a plurality of circuit blocks by way of predetermined combinations. For example, various circuit blocks including an RF (Radio Frequency) circuit, a power supply circuit and the like are formed.

In addition to the aforementioned various electronic components, the reference potential patterned layer 75 that configures a reference potential portion is formed on a first face 70a on the case body 60 side of the circuit board 70. The reference potential patterned layer 75 is formed so as to partition each circuit block described above. The reference potential patterned layer 75 is formed by printing an electrically conductive member in a predetermined pattern on the surface of the first face 70a of the circuit board 70. An RFID chip 110 that is connected to the loop antenna 100 is disposed on a second face 70b on the battery side of the circuit board 70. An external reading/writing device reads and writes information from and into the RFID chip 110 via the loop antenna 100.

The main antenna unit 90 is configured by disposing an antenna element of a predetermined shape on a base. The main antenna unit 90 is disposed on the end portion side that is opposite to the connecting portion 4 side in the cellular telephone device 1. The antenna element of the main antenna unit 90 is formed of a belt-shaped sheet metal. Moreover, the main antenna unit 90 is fed with power from the circuit board 70 via a feed terminal (not illustrated). As a result, the antenna element is fed with power from the circuit board 70 via the feed terminal, and is connected to the RF modules and the like on the circuit board 70.

As shown in FIGS. 4 to 6, the loop antenna 100 is disposed across the operation unit side body 2 and the display unit side body 3.

As shown in FIG. 4, the loop antenna 100 includes a sheet portion 102 and a coil portion 104 disposed on the sheet portion 102.

The sheet portion 102 is a sheet-like member consisting of a PET (polyethylene terephthalate) material, and is a flexibly deformable member.

The coil portion 104 is formed by coiling a film-like conductive member.

The loop antenna 100 communicates with a reading/writing device (not illustrated) at a predetermined usable frequency band (for example, 13.56 Hz).

As shown in FIG. 4, the loop antenna 100 includes a first portion 100a disposed on the operation unit side body 2 side, a second portion 100b disposed on the display unit side body 3 side, and third portions 100c and 100c, at least a part of the third portions 100c being disposed in the connecting portion 4.

As shown in FIGS. 5 and 6, the first portion 100a is disposed on the operation unit side outer face 2B side of the operation unit side body 2. The second portion 100b is disposed on the display unit side outer face 3B side of the display unit side body 3.

As shown in FIGS. 4 and 5, the loop antenna 100 forms a loop in a case in which the cellular telephone device 1 is in the opened state. The loop antenna 100 forms a loop extending in a plane in a case in which the cellular telephone device 1 is in the opened state. The loop antenna 100 assumes an annular shape extending in a plane. In the state in which a loop is formed, the loop antenna 100 can receive a magnetic field, and can generate an electromotive force by way of electromagnetic induction. In other words, in the state in which a loop is formed, the loop antenna 100 can communicate with a reading/writing device disposed outside.

In addition, as shown in FIG. 6, in a case in which the cellular telephone device 1 is in the closed state, the loop antenna 100 is transformed in accordance with the transformation of the cellular telephone device 1, and enters a state in which a loop is not formed. More specifically, in a case in which the cellular telephone device 1 is in the closed state, as for the loop antenna 100, the third portions 100c and 100c are in a state of being bent, and the first portion 100a and the second portion 100b are in a state of being disposed to face each other. In other words, in a case in which the cellular telephone device 1 is in the closed state, as for the loop antenna 100, the first portion 100a disposed in the operation unit side body 2 side, and the second portion 100b disposed in the display unit side body 3 side are disposed so as to be superimposed with each other in a direction in which the operation unit side body 2 and the display unit side body 3 are superimposed.

Although the loop antenna 100 forms a loop in a case in which the cellular telephone device 1 is in the opened state, the loop antenna 100 does not form a planar loop in this case since the loop antenna 100 is bent. For example, as a plane that is viewed from above in FIG. 6, only the first portion 100a of the loop antenna 100 can be seen. More specifically, the coil portion 104 (a U-shaped portion) of the first portion 100a can be seen in such a plane.

In a case in which the cellular telephone device 1 in the closed state is arranged adjacently to a reading/writing device that is disposed outside, the loop antenna 100 does not form a loop when viewed from the reading/writing device, even if the operation unit side outer face 2B is arranged adjacently thereto, even if the display unit side outer face 3B is arranged adjacently thereto, and even if the connecting portion 4 side is arranged adjacently thereto.

In other words, in a case in which the cellular telephone device 1 is in the closed state, the loop antenna 100 cannot communicate with a reading/writing device disposed outside.

As shown in FIG. 2, a removable battery lid 2c is provided on one end side of the rear case 2b (in FIG. 2). The battery lid 2c is mounted to the rear case 2b after accommodating the battery 80 from the outside of the rear case 2b. Furthermore, the microphone 12 (not illustrated) for inputting sound of the user is accommodated in one end side of the rear case 2b.

As shown in FIG. 4, the display unit side body 3 includes: the front panel 3a; the front case 3b; the speaker 22; the display unit 21; a printed circuit board 85 to which the display unit 21 is connected; the rear case 3c; and the rear panel 3d.

The front panel 3a, the front case 3b, the display unit 21, the printed circuit board 85, the rear case 3c and the rear panel 3d are disposed so as to be superimposed in the display unit side body 3. More specifically, the front case 3b and the rear case 3c are disposed such that concave inner surfaces thereof face each other, and are connected such that peripheries thereof are superimposed with each other.

In addition, the printed circuit board 85 to which the display 21 is connected is built in and interposed between the front case 3b and the rear case 3c. A speaker, to which an amplifier (not illustrated) is connected, is connected to the printed circuit board 85.

Subsequently, a circuit configuration of the cellular telephone device 1 is described with reference to FIG. 7.

Figure 7:
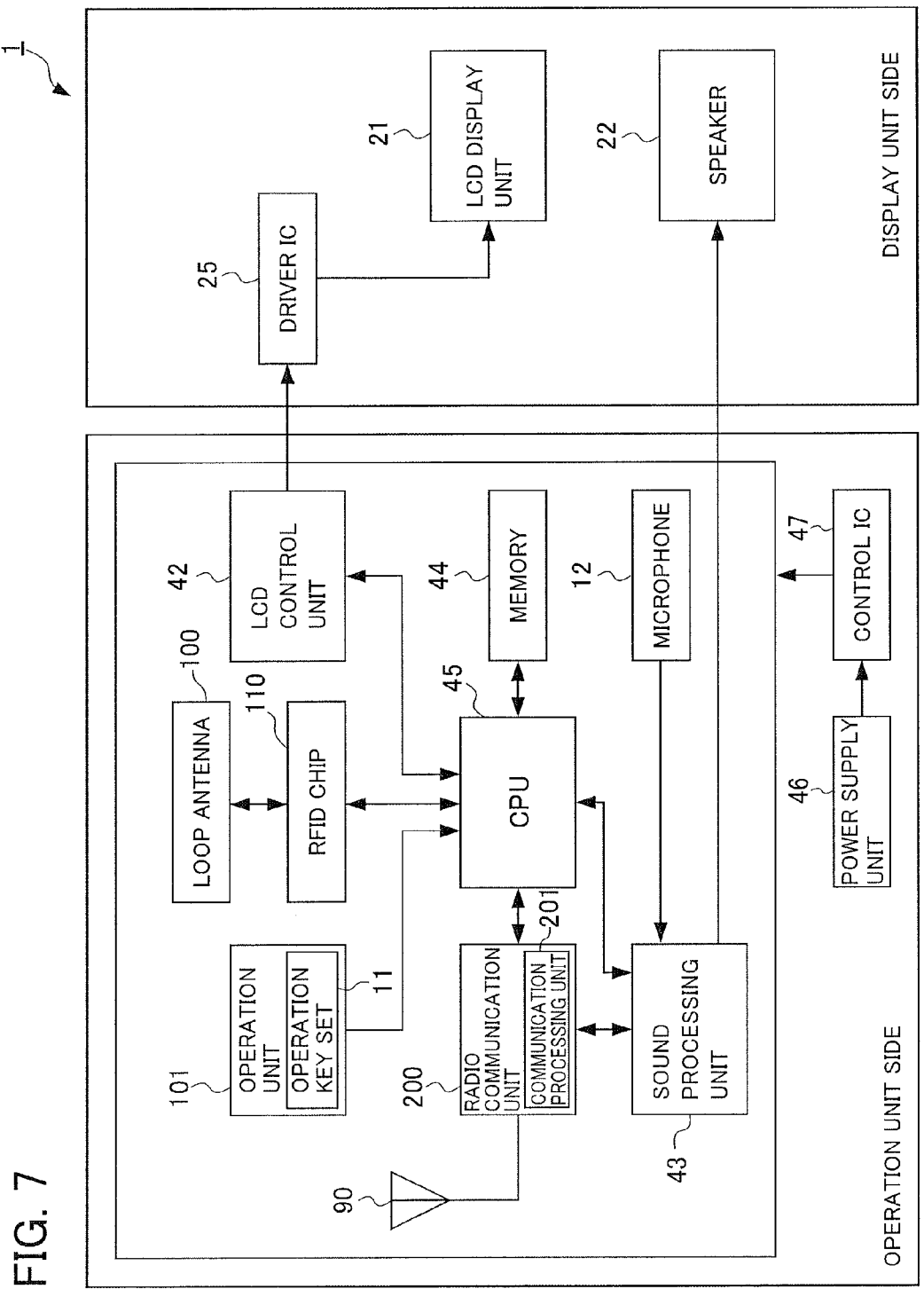
FIG. 7 is a block diagram illustrating a circuit configuration of the cellular telephone device 1.

FIG. 7 is a block diagram illustrating the circuit configuration of the cellular telephone device 1.

As shown in FIG. 7 the cellular telephone device 1 includes: a radio communication unit 200 disposed in the operation unit side body 2; an operation unit 101 as an input unit; the microphone 12; an LCD control unit 42; a sound processing unit 43; memory 44 as a storage unit; a CPU 45; a power supply unit 46; a control IC 47; the loop antenna 100; the RFID chip 110; the display unit 21 disposed in the display unit side body 3; the speaker 22; and a driver IC 25.

The radio communication unit 200 includes: the main antenna unit 90 that communicates with external devices at a predetermined usable frequency band; and a communication processing unit 201 that performs signal processing such as modulation processing or demodulation processing.

The main antenna unit 90 communicates with base stations (not illustrated) at a predetermined usable frequency band (for example, 800 MHz). The main antenna unit 90 communicates with external communication devices via the base stations at the predetermined usable frequency band. It should be noted that, although the predetermined usable frequency band is set to 800 MHz in the present embodiment, other frequency bands can also be used. Moreover, the main antenna unit 90 may be configured as a so-called dual band compatible antenna that can accept a second usable frequency band (for example, 2 GHz) in addition to the predetermined usable frequency band (a first usable frequency band), or as a multi-band compatible antenna that can further accept a third usable frequency band.

The communication processing unit 201 performs modulation processing on a signal transmitted from a predetermined function unit, and transmits the signal to base stations via the main antenna unit 90, and in addition, performs demodulation processing on a signal received via the main antenna unit 90, and transmits the signal to a predetermined function unit.

The operation unit 101 is configured by including the operation key set 11.

The LCD control unit 42 performs predetermined image processing on input image data in accordance with control by the CPU 45, and outputs the image data, on which the image processing has been performed, to the driver IC 25. The driver IC 25 stores the image data being input from the LCD control unit 42 in frame memory, and outputs the image data stored in the frame memory to the display unit 21 at predetermined timing.

The display unit 21 displays predetermined characters and images based on the data that is input from the driver IC 25.

The memory 44 stores predetermined data. More specifically, the memory 44 stores application programs that operate various functions, profile information, address information that is utilized for an address book function, and the like.

The CPU 45 controls the entirety of the cellular telephone device 1. The CPU 45 performs predetermined control of, in particular, the radio communication unit 200, the LCD control unit 42 and the sound processing unit 43.

In accordance with control by the CPU 45, the sound processing unit 43 performs predetermined sound processing on a signal transmitted from the communication processing unit 201, and outputs the signal on which the sound processing has been performed to the speaker 22. The speaker 22 outputs sound to the outside, based on a signal that is transmitted from the sound processing unit 43. Moreover, in accordance with control by the CPU 45, the sound processing unit 43 performs predetermined processing on a signal that is input from the microphone 12, and outputs the signal thus processed to the communication processing unit 201. The communication processing unit 201 performs predetermined processing on the signal that is input from the sound processing unit 43, and outputs the signal thus processed to the main antenna unit 90.

The power supply unit 46 is configured by including the battery 80. The battery 80 is a lithium-ion battery having predetermined capacity. The control IC 47 converts a power supply voltage, which is supplied from the power supply unit 46, into a predetermined power voltage, and supplies the power supply voltage thus converted to each unit (for example, the CPU 45 and the like) of the cellular telephone device 1.

The loop antenna 100, when approaching within a predetermined distance to a reading/writing device disposed outside, receives a magnetic field transmitted from the reading/writing device (modulated with respect to a carrier frequency (for example, 13.56 MHz)).

The RFID chip 110 includes: a power circuit that generates a predetermined voltage based on electrical power induced by a signal received via the loop antenna 100; an RF circuit that performs signal processing such as modulation processing or demodulation processing on a signal communicated via the loop antenna 100; a CPU that performs predetermined arithmetic processing; and memory that stores predetermined data.

The power circuit is configured with, for example, a DC-DC converter.

The power circuit generates a predetermined power supply voltage from an electromotive force that is produced by an electromagnetic induction effect of the loop antenna 100 having received a magnetic field, and supplies the power supply voltage to the RF circuit, the CPU and the memory. The RF circuit, the CPU and the memory transition from a halt state to an active state as a result of the predetermined power supply voltage being supplied from the power circuit.

The RF circuit performs signal processing such as demodulation on a signal received via the loop antenna 100, and transmits the signal thus processed to the CPU.

The RF circuit performs signal processing such as modulation on data that has been read from the memory, and transmits the data to an external reading/writing device via the loop antenna 100.

Based on such a signal transmitted from the RF circuit, the CPU writes or reads data to or from the memory. In a case of reading data from the memory, the CPU transmits the data to the RF circuit.

Here, in a case in which the cellular telephone device 1 is in the opened state (see FIGS. 4 and 5), the loop antenna 100 forms a loop, and thus the loop antenna 100 is in a state of being capable of communicating with a reading/writing device disposed outside, as described above. In other words, in the opened state, the cellular telephone device 1 is in a state of being capable of writing and reading data to and from the RFID chip 110.

Moreover, in a case in which the cellular telephone device 1 is in the closed state (see FIG. 6), the loop antenna 100 does not form a loop, and thus the loop antenna 100 is in a state of not being capable of communicating with a reading/writing device, as described above. In other words, in the closed state, the cellular telephone device 1 is in a state of not being capable of writing and reading data to and from the RFID chip 110.

In other words, the cellular telephone device 1 in the present embodiment can be switched between the state of being capable of communicating via the loop antenna 100 and the state of not being capable of communicating via the loop antenna 100, by changing its form (the opened state and the closed state). In the present embodiment, in the closed state where the communication function or the like is not utilized while the user is carrying the cellular telephone device 1, the cellular telephone device 1 is in the state of not being capable of communicating via the loop antenna 100.

According to the present embodiment, there is provided a cellular telephone device 1 including the loop antenna 100 that forms a loop in a case in which the cellular telephone device 1 is in the opened state, and does not form a loop in a case in which the cellular telephone device 1 is in the closed state. According to the present embodiment, there is provided a cellular telephone device 1, in which communication via the loop antenna 100 is possible in the opened state, and communication via the loop antenna 100 is not possible in the closed state.

In addition, according to the present embodiment, it is possible to switch between the state of being capable of communicating via the loop antenna 100 and the state of not being capable of communicating via the loop antenna 100, only by changing the opened state and the closed state of the cellular telephone device 1. As a result, the user can switch between the state of being capable of communicating via the loop antenna 100 and the state of not being capable of communicating via the loop antenna 100, by way of a simple operation. Furthermore, the state of being capable of communicating via the loop antenna 100 and the state of not being capable of communicating via the loop antenna 100 can be switched by way of a simple operation, a result of which suppresses failure to switch to the state of not being capable of communication for a conventional reason that a switching operation is complicated. As a result, unintentional writing and reading information to and from the RFID tip 110, which are not intended by the user, are suppressed. For example, this suppresses stealth withdrawal of electronic money charged therein.

Moreover, according to the present embodiment, the cellular telephone device 1 is not capable of communicating via the loop antenna 100 in the closed state that is an ordinary carrying state; therefore, unintentional reading and writing of information as described above can be preferably suppressed. In other words, the cellular telephone device 1 with improved security is provided.

Although the preferable embodiment has been described above, the present invention is not limited to the aforementioned embodiment, and can be implemented as various embodiments. For example, the cellular telephone device 1 is described as a portable electronic device in the present embodiment; however, the present invention is not limited thereto, and the portable electronic device may be a PHS (Personal Handyphone System), a PDA (Personal Digital Assistant), a portable navigation device, a notebook PC, or the like.

In addition, in the present embodiment, the loop antenna 100 includes the sheet portion 102 and the coil portion 104 disposed on the sheet portion 102 and formed by coiling a film-like conductive member; however, the loop antenna 100 is not limited thereto, and may be configured by including a coil portion on which a lead wire is wound.

Furthermore, in the present embodiment, the loop antenna 100 (the RFID chip 110) has been described as a passive induction field type (electromagnetic induction type) without a power supply unit; however, the loop antenna 100 is not limited thereto. The loop antenna 100 (the RFID chip 110) may be of, for example, a passive mutual induction type (electromagnetic coupling type) or a radiation electromagnetic field type (radio wave type). Moreover, the loop antenna 100 (the RFID chip 110) may be of, for example, an active type having a power supply unit.

In addition, an external device may be of a read/write type, a read-only type, a write-once type, etc.

Moreover, in the present embodiment, the cellular telephone device 1 is described as being foldable (openable and closable) via the connecting portion 4; however, the cellular telephone device 1 is not limited thereto. The cellular telephone device 1 may be configured so as to be transformable into the first state in which the display unit side body 3 is disposed in the first relative position with regard to the operation unit side body 2, and the second state in which the display unit side body 3 is disposed in the second relative position different from the first relative position with regard to the operation unit side body 2; and the cellular telephone device 1 may be of, for example: a so-called 2-axis hinge type that is openable, closable and rotatable; and a slider type in which one body slides in one direction from a state in which the operation unit side body 2 and the display unit side body 3 are mutually superimposed.

A description is hereinafter provided for embodiments of a 2-axis hinge type and a slider type.

First, a description is provided for an embodiment in which a cellular telephone device is of a 2-axis hinge type, with reference to FIGS. 8 to 11.

Figure 8:
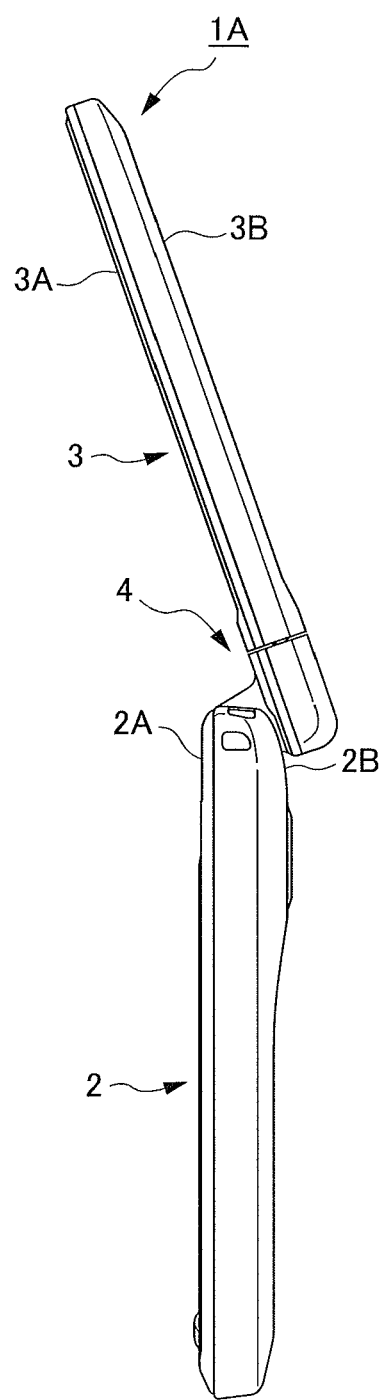
FIG. 8 is a side view of a cellular telephone device 1A in a first opened state.
Figure 9:
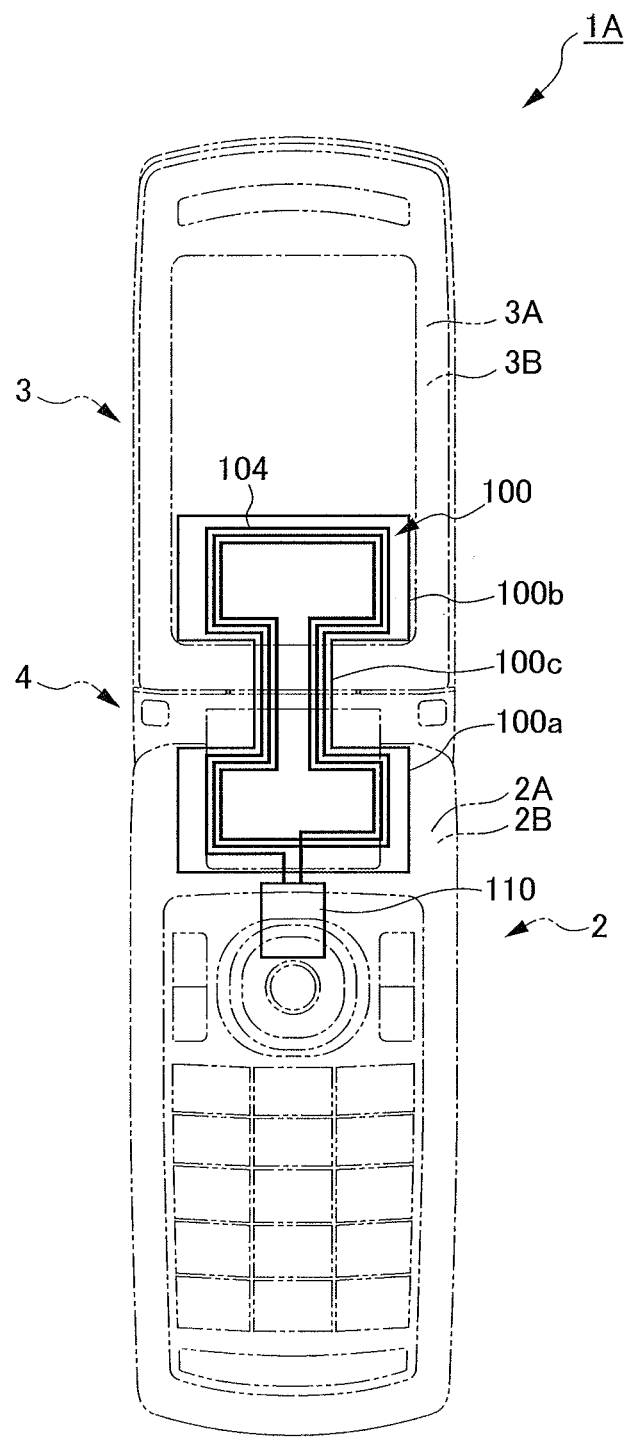
FIG. 9 is a diagram illustrating an arrangement and a state of the loop antenna 100 in the first opened state.
Figure 10:
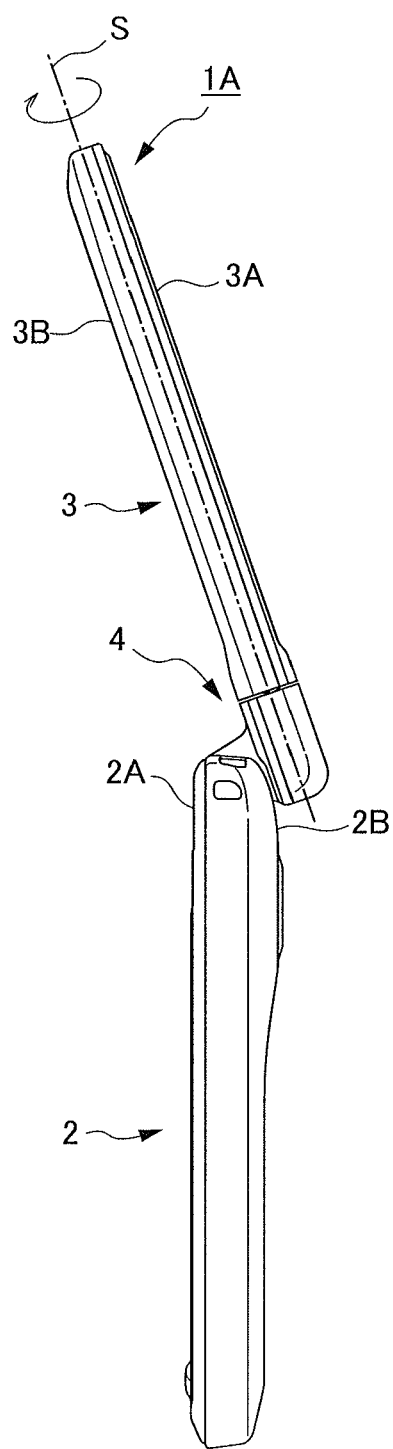
FIG. 10 is a side view of the cellular telephone device 1A in a second opened state.
Figure 11:
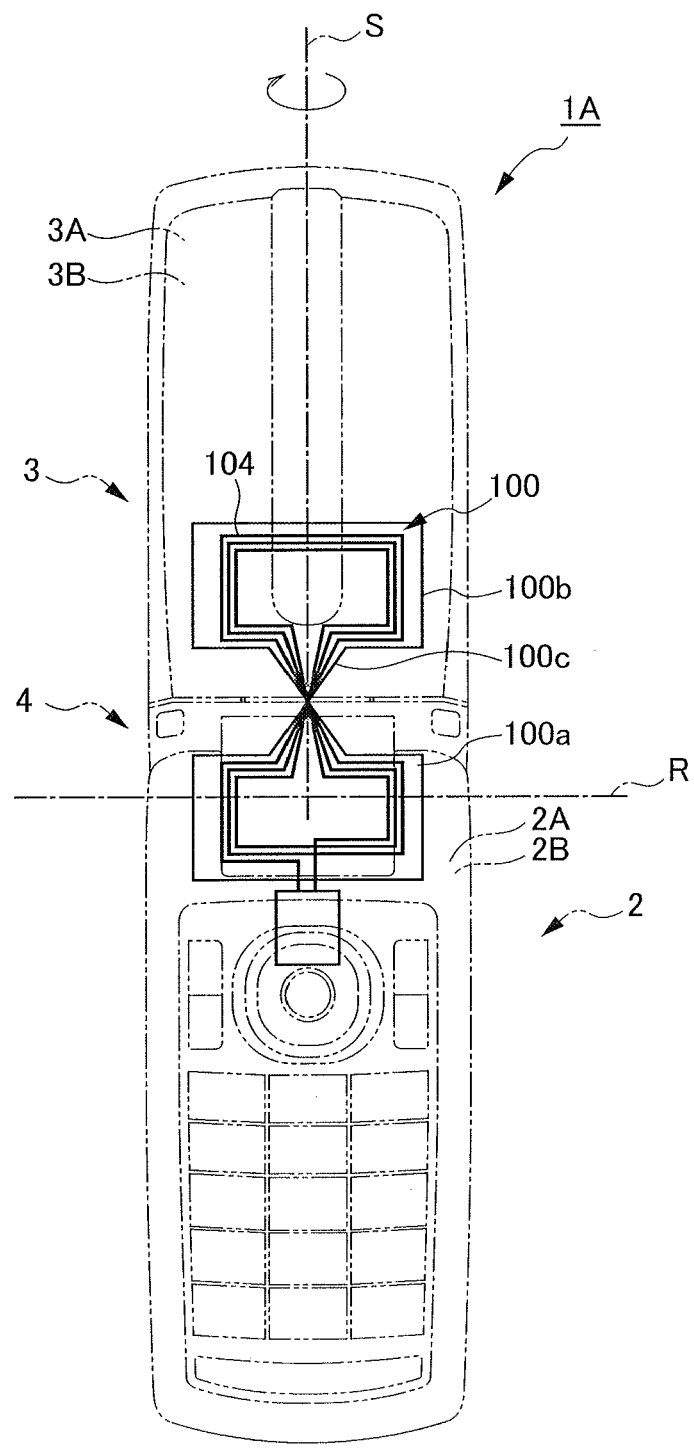
FIG. 11 is a diagram illustrating an arrangement and a state of the loop antenna 100 in the second opened state.

FIG. 8 is a side view of a cellular telephone device 1A in a first opened state. FIG. 9 is a diagram illustrating an arrangement and a state of the loop antenna 100 in the first opened state. FIG. 10 is a side view of the cellular telephone device 1A in a second opened state. FIG. 11 is a diagram illustrating an arrangement and a state of the loop antenna 100 in the second opened state. Here, the first opened state refers to an opened state in which the operation unit side inner face 2A and the display unit side inner face 3A are oriented to the same side (to the left side in FIG. 8). The second opened state refers to an opened state in which the operation unit side inner face 2A and the display unit side inner face 3A are oriented to different sides (to the left side and the right side in FIG. 10, respectively).

In the following, descriptions of configurations similar to those of the aforementioned cellular telephone device 1 (the opening-and-closing type) are omitted, and different configurations are mainly described.

As shown in FIGS. 8 to 11, the cellular telephone device 1A includes the operation unit side body 2 and the display unit side body 3. The operation unit side body 2 and the display unit side body 3 are connected via the connecting portion 4 including a 2-axis hinge mechanism. As a result, the cellular phone 1A is transformable into the opened state and the closed state, and the display unit side body 3 can be switched between a front side state and a back side state in each of the opened state and the closed state.

Here, the closed state and the opened state are the same as those described for the aforementioned cellular telephone device 1.

Moreover, the cellular telephone device 1A in the opened state is transformable to switch the front and back of the display unit side body 3. The cellular telephone device 1A in the opened state is transformable from the first opened state in which the operation unit side inner face 2A and the display unit side inner face 3A are oriented to the same side (to the left side in FIG. 8) to the second opened state in which the operation unit side inner face 2A and the display unit side inner face 3A are oriented to different sides (to the left side and the right side in FIG. 10, respectively).

The connecting portion 4 connects the operation unit side body 2 and the display unit side body 3 so as to be openable and closable, and so as to be capable of reversing the front and back of the display unit side body 3 with regard to the operation unit side body 2.

In the opened state, the connecting portion 4 connects the operation unit side body 2 and the display unit side body 3 such that the display unit side body 3 is rotatable around a rotational axis S (see FIG. 11), which intersects an opening-and-closing axis R, with regard to the operation unit side body 2.

As shown in FIGS. 9 and 11, the loop antenna 100 includes the first portion 100a disposed on the operation unit side body 2 side, the second portion 100b disposed on the display unit side body 3 side, and a third portion A 100c, at least a part of the third portion 100c being disposed in the connecting portion 4. The third portion A 100c in the loop antenna 100 is formed so as to be narrower in width than the first portion 100a and the second portion 100b.

As shown in FIG. 9, the loop antenna 100 forms a loop in a case in which the cellular telephone device 1A is in the first opened state. In a case in which the cellular telephone device 1A is in the first opened state, the loop antenna 100 forms a loop, of which center in the longitudinal direction is inwardly concave (narrowed) when viewed from the front in FIG. 9. More specifically, in a case in which the cellular telephone device 1A is in the first opened state, the coil portion 14 configuring the loop antenna 100 forms a loop, of which center in the longitudinal direction is inwardly concave (narrowed) when viewed from the front in FIG. 9.

When the first opened state in FIGS. 8 and 9 transitions to the second opened state by rotating the display unit side body 3 around the rotational axis S such that the display unit side inner face 3A is oriented to the opposite side, the loop antenna 100 enters a state in which the third portion A 100c is twisted as shown in FIG. 11. More specifically, in the second opened state, the coil portion 104 configuring the loop antenna 100 is twisted in a portion (skew lines) disposed in the third portion A 100c.

As a result, in the second opened state, the loop antenna 100 is in the state in which a loop is not formed. More specifically, in the second opened state, the coil portion 104 configuring the loop antenna 100 is in the state in which a loop is not configured.

As described above, in a case in which the cellular telephone device 1A is in the opened state, by rotating the display unit side body 3 so as to reverse the front and back thereof with regard to the operation unit side body 2, the state of being capable of communicating via the loop antenna 100 can be switched to the state of not being capable of communicating via the loop antenna 100.

In addition, the cellular telephone device 1A is in a state of being capable of communicating via the loop antenna 100 only in the first opened state.

According to the present embodiment, an effect similar to the effect in the aforementioned cellular telephone device 1 can be achieved.

Furthermore, according to the present embodiment, since communication via the loop antenna 100 is possible only in the first opened state, the security is further improved.

Moreover, the structure and configuration of the loop antenna 100, and other forms of type of an external device are similar to those in the cellular telephone device 1.

Next, a description is provided for an embodiment in which the cellular telephone device is of a slider type, with reference to FIGS. 12 to 15.

Figure 12:
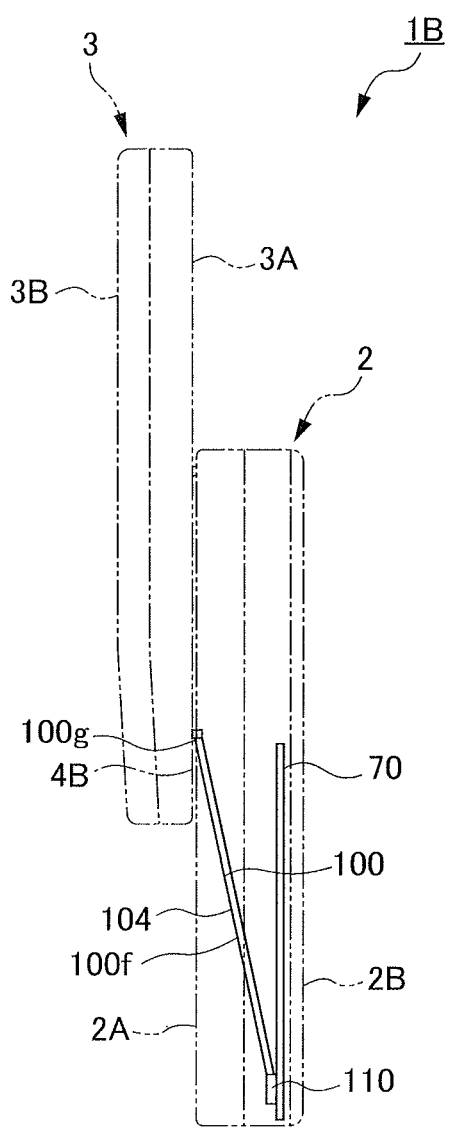
FIG. 12 is a side view of a cellular telephone device 1B in an opened state.
Figure 13:
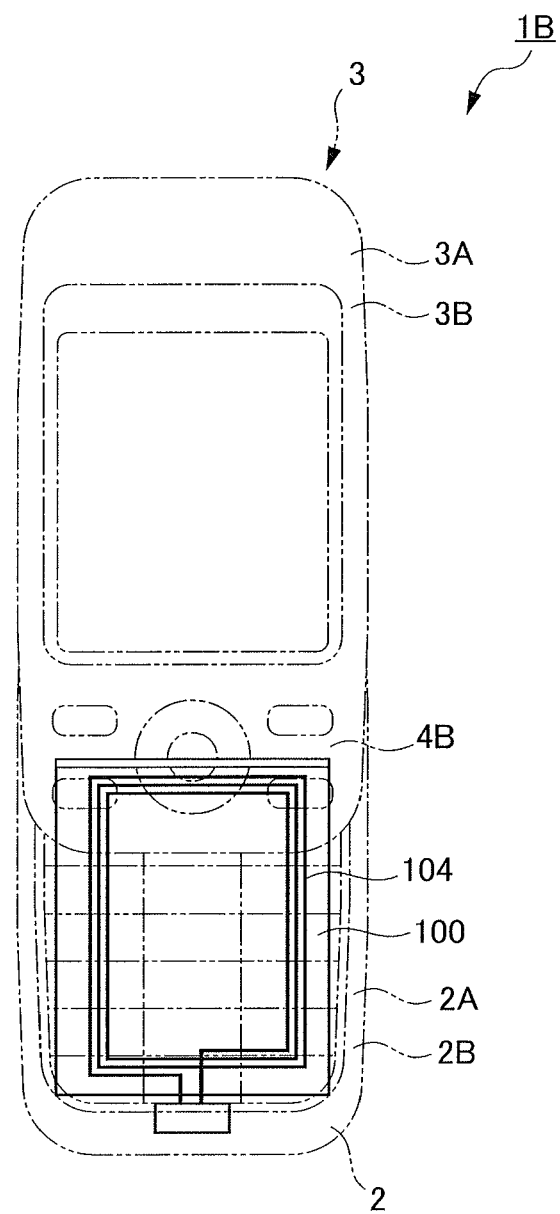
FIG. 13 is a diagram illustrating an arrangement and a state of the loop antenna 100 in the opened state.
Figure 14:
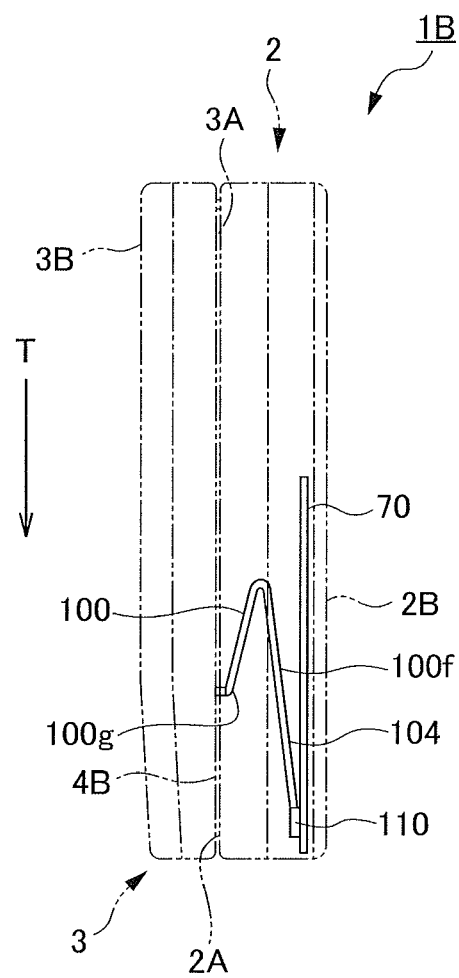
FIG. 14 is a side view of the cellular telephone device 1B in a closed state.
Figure 15:
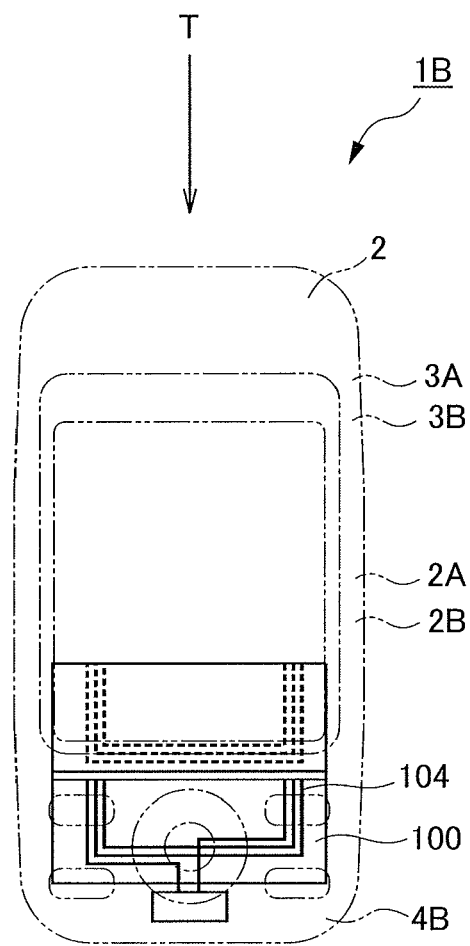
FIG. 15 is a diagram illustrating an arrangement and a state of the loop antenna 100 in the closed state.

FIG. 12 is a side view of a cellular telephone device 1B in an opened state. FIG. 13 is a diagram illustrating an arrangement and a state of the loop antenna 100 in the opened state. FIG. 14 is a side view of the cellular telephone device 1B in a closed state. FIG. 15 is a diagram illustrating an arrangement and a state of the loop antenna 100 in the closed state.

In the following, descriptions of configurations similar to those of the aforementioned cellular telephone device 1 (the opening-and-closing type) are omitted, and different configurations are mainly described.

As shown in FIGS. 12 to 15, the cellular telephone device 1B includes the operation unit side body 2 and the display unit side body 3 that is disposed so as to be superimposed on the operation unit side inner face 2A side of the operation unit side body 2. The display unit side body 3 is connected with the operation unit side body 2 so as to be slidably moved over the operation unit side inner face 2A.

The cellular telephone device 1B includes a connecting portion 4B that connects the operation unit side body 2 and the display unit side body 3 such that the operation unit side body 2 and the display unit side body 3 slidably move with regard to each other. The connecting portion 4B connects the operation unit side body 2 and the display unit side body 3 such that the cellular telephone device 1B is transformable into an opened state and a closed state.

More specifically, the connecting portion 4B connects the operation unit side body 2 and the display unit side body 3 so as to be slidably moved, such that the cellular telephone device 1B is transformable into: an opened state (see FIGS. 12 and 13) in which the display unit side body 3 is disposed in an opened position as a first relative position with regard to the operation unit side body 2, and a predetermined area of the operation unit side inner face 2A is exposed to the outside; and a closed state (see FIGS. 14 and 15) in which the display unit side body 3 is disposed in a closed position as a second relative position with regard to the operation unit side body 2, so as to cover the predetermined area of the operation unit side inner face 2A.

As shown in FIGS. 12 to 15, the loop antenna 100 includes: a first portion 100f that is disposed inside the operation unit side body 2; and a second portion 100g that is attached on an outer face of the display unit side body 3.

As shown in FIG. 13, in a case in which the cellular telephone device 1B is in the opened state, the loop antenna 100 forms a loop. More specifically, in a case in which the cellular telephone device 1B is in the opened state, the loop antenna 100 forms a loop when viewed from the front in FIG. 13. More specifically, in a case in which the cellular telephone device 1B is in the opened state, the coil portion 104 configuring the loop antenna 100 forms a loop when viewed from the front in FIG. 13.

When the opened state in FIGS. 12 and 13 transitions to the closed state by slidably moving the display unit side body 3 in a direction of an arrow T (see FIGS. 14 and 15), the first portion 100f and the second portion 100g of the loop antenna 100 are disposed so as to be mutually superimposed in the direction in which the operation unit side body 2 and the display unit side body 3 are superimposed, as shown in FIGS. 14 and 15. In this case, as shown in FIG. 15, the loop antenna 100 is in a state in which a loop is not formed. More specifically, in the closed state, the coil portion 104 configuring the loop antenna 100 is in a state in which a loop is not configured.

According to the present embodiment, an effect similar to the effect in the aforementioned cellular telephone device 1 can be achieved.

Moreover, the structure and configuration of the loop antenna 100, and other forms of type of an external device are similar to those in the cellular telephone device 1.

The invention claimed is:

1. A portable electronic device, comprising:
a first body including a first face;
a second body including a second face;
a connecting portion that connects the first body and the second body so as to be openable and closable around an opening-and-closing axis, and transformable into an opened state in which the first face and the second face are disposed to be separated from each other, and a closed state in which the first face and the second face are disposed to be superimposed in a state of being adjacent to each other; and
a loop antenna that is disposed in the first body and the second body, and is transformed such that a loop is formed in the opened state and the loop is not formed in the closed state,
wherein the connecting portion connects the first body and the second body such that the second body is rotatable with regard to the first body around a rotational axis that intersects the opening-and-closing axis, and
wherein, in a case in which the second body is rotated around the rotational axis such that the second face is oriented to an opposite side, the loop antenna is transformed to be twisted such that the loop is not formed even in the opened state.

2. The portable electronic device according to claim 1, wherein the loop antenna includes a third portion that is formed to connect the first portion and the second portion, and is transformed to be twisted.

3. The portable electronic device according to claim 2, wherein the third portion A is formed to be narrower in width than the first portion and the second portion.

4. A portable electronic device, comprising:

a first body including a first face;

a second body that is disposed so as to be superimposed on a side of the first face of the first body;

a connecting portion that connects the first body and the second body so as to be slidably moved and to be transformable into an opened state in which a predetermined area of the first face is externally exposed, and a closed state in which the predetermined area is covered; and a loop antenna that is disposed in the first body and the second body, and is transformed such that a loop is formed in the opened state and the loop is not formed in the closed state, wherein communication with an external device via the loop antenna is performed when the loop antenna forms the loop, and wherein communication with an external device via the loop antenna is disabled when the loop antenna does not form the loop.

5. The portable electronic device according to claim 4, wherein the loop antenna includes a first portion disposed in the first body and a second portion disposed in the second body, and wherein the loop antenna is transformed to be bent in the closed state, such that the first portion and the second portion are disposed so as to be mutually superimposed in a direction in which the first body and the second body are superimposed.

6. The portable electronic device according to claim 5, wherein the first portion of the loop antenna is disposed inside the first body, and wherein the second portion of the loop antenna is attached on an outer face of the second body.

* * * * *